United States Patent
Mogi

(10) Patent No.: US 8,857,163 B2
(45) Date of Patent: Oct. 14, 2014

(54) EXHAUST HEAT UTILIZATION SYSTEM

(76) Inventor: Satoshi Mogi, Tokyo (JP)

(\*) Notice: Subject to any disclaimer, the term of this patent is extended or adjusted under 35 U.S.C. 154(b) by 0 days.

(21) Appl. No.: 13/980,340

(22) PCT Filed: Aug. 2, 2011

(86) PCT No.: PCT/JP2011/067653
§ 371 (c)(1),
(2), (4) Date: Jul. 18, 2013

(87) PCT Pub. No.: WO2012/098718
PCT Pub. Date: Jul. 26, 2012

(65) Prior Publication Data
US 2013/0298538 A1    Nov. 14, 2013

(30) Foreign Application Priority Data
Jan. 21, 2011   (JP) .................................. 2011-011012

(51) Int. Cl.
| | | |
|---|---|---|
| F01N 3/02 | (2006.01) | |
| F24H 1/20 | (2006.01) | |
| F01N 5/02 | (2006.01) | |
| F02G 5/02 | (2006.01) | |
| F24D 15/00 | (2006.01) | |
| F28D 20/00 | (2006.01) | |

(52) U.S. Cl.
CPC *F01N 5/02* (2013.01); *F24H 1/208* (2013.01); *F24D 2200/26* (2013.01); *F02G 5/02* (2013.01); *F24D 15/00* (2013.01); *Y02T 10/166* (2013.01); *F28D 2020/0026* (2013.01)
USPC .......................................................... 60/320

(58) Field of Classification Search
CPC ............. F02G 5/02; F24H 1/208; F01N 5/02; F24D 15/00
USPC ............................................................. 60/320
See application file for complete search history.

(56) References Cited

U.S. PATENT DOCUMENTS

| | | | |
|---|---|---|---|
| 2008/0022708 A1* | 1/2008 | Cho et al. ..................... | 62/238.7 |
| 2008/0035304 A1* | 2/2008 | Roden et al. ..................... | 165/41 |
| 2008/0257284 A1* | 10/2008 | Otterstrom et al. ............... | 123/2 |
| 2010/0205958 A1* | 8/2010 | Ishii ................................ | 60/616 |

FOREIGN PATENT DOCUMENTS

| | | |
|---|---|---|
| JP | 48-033649 A | 5/1973 |
| JP | 48-079452 A | 10/1973 |
| JP | 1-125963 U | 8/1989 |
| JP | 3034876 U | 12/1996 |
| JP | 10-159652 A | 6/1998 |
| JP | 2006-177636 A | 7/2006 |
| JP | 2008-228622 A | 10/2008 |

OTHER PUBLICATIONS

International Search Report corresponding to co-pending International Patent Application Serial No. PCT/JP2011/067653, Japanese Patent Office, dated Sep. 13, 2011; (2 pages).

\* cited by examiner

*Primary Examiner* — Jesse Bogue
*Assistant Examiner* — Jason Shanske
(74) *Attorney, Agent, or Firm* — Nixon Peabody LLP

(57) ABSTRACT

To effectively utilize exhaust heat of an engine mounted on a vehicle. An exhaust heat utilization system includes a working fluid heating tank (11) mounted on a truck (10) driven by an engine (12) and configured to heat a working fluid (30) stored therein with exhaust heat of the engine (12) and a heater (26) configured to heat a greenhouse (25) with the working fluid (30) heated by the working fluid heating tank (11). Exhaust heat recovered from the truck (10) is utilized for the heating of the greenhouse (25).

2 Claims, 5 Drawing Sheets

EXHAUST HEAT UTILIZATION SYSTEM

CROSS-REFERENCE TO RELATED APPLICATIONS

This application is a U.S. National Stage of International Application No. PCT/JP2011/067653, filed Aug. 2, 2011, which claims the benefit of Japanese Patent Application No. 2011-011012, filed on Jan. 21, 2011, both of which are incorporated herein by reference in their entireties.

TECHNICAL FIELD

The present invention relates to an exhaust heat utilization system and, more particularly, to the configuration of a system that utilizes exhaust heat of a vehicle.

BACKGROUND ART

In recent years, various methods for utilizing exhaust heat for environmental protection have been proposed. For example, there is proposed a method of driving a generator using a gas engine as a power source, recovering exhaust heat from the engine with an exhaust heat recovery heat exchanger, storing the recovered exhaust heat in a hot water tank as hot water, and supplying the hot water from the hot water tank to an external facility (see, for example, PTL 1). There is also proposed a tri-generation system that receives the supply of fuel containing carbon, recovers, with an exhaust heat recovery unit, exhaust heat from a motor for driving a generator, supplies the heat to a greenhouse for protected horticulture, and supplies carbon oxide generated by combustion of the fuel to the greenhouse for protected horticulture as well (see, for example, PTL 2). PTL 2 also proposes to provide a hot water tank to temporarily store heat and enable heating of the greenhouse even when the motor is stopped.

RELATED ART REFERENCES

Patent Literature

PTL 1: JP-A-2006-177636
PTL 2: JP-A-2008-228622

DISCLOSURE OF INVENTION

Summary of the Invention

Problem to be Solved by the Invention

On the other hand, internal combustion engines such as a gasoline engine and a diesel engine are used for driving vehicles such as a passenger car and a truck. Thermal efficiency of these vehicle driving engines is about 20% at most. Most thermal energy is emitted to the atmosphere. However, since an engine mounted on a vehicle moves together with the vehicle, in the methods of recovering exhaust heat of the fixed engine for power generation and the motor described in PTLs 1 and 2, there is a problem in that the emitted heat cannot be recovered and it is difficult to effectively utilize the exhaust heat.

It is an object of the invention to effectively utilize the exhaust heat of the engine mounted on the vehicle.

Means for Achieving the Objects

An exhaust heat utilization system according to the invention is an exhaust heat utilization system including: a working fluid heating tank mounted on a vehicle driven by an engine and configured to heat a working fluid stored therein with exhaust heat of the engine; and exhaust heat utilizing means for utilizing the exhaust heat recovered by supplying the working fluid heated by the working fluid heating tank. The exhaust heat utilization system includes: a heat insulation tank connected to a working fluid inlet of the exhaust heat utilizing means and configured to store the working fluid heated by the working fluid heating tank and have a capacity larger than a capacity of the working fluid heating tank; and a working fluid recovery tank connected to a working fluid outlet of the exhaust heat utilizing means and configured to store the working fluid having temperature lower than temperature at the working fluid inlet and have a capacity larger than the capacity of the working fluid heating tank. The exhaust heat utilization system transfers the heated working fluid in the working fluid heating tank to the heat insulation tank and fills the emptied working fluid heating tank with the low-temperature working fluid stored in the working fluid recovery tank.

In the exhaust heat utilization system according to the invention, it is also suitable that the working fluid heating tank is detachably mounted on the vehicle.

Advantageous Effects of Invention

The invention produces an effect that it is possible to effectively utilize the exhaust heat of the engine mounted on the vehicle.

DESCRIPTION OF EMBODIMENTS

Figure 1:
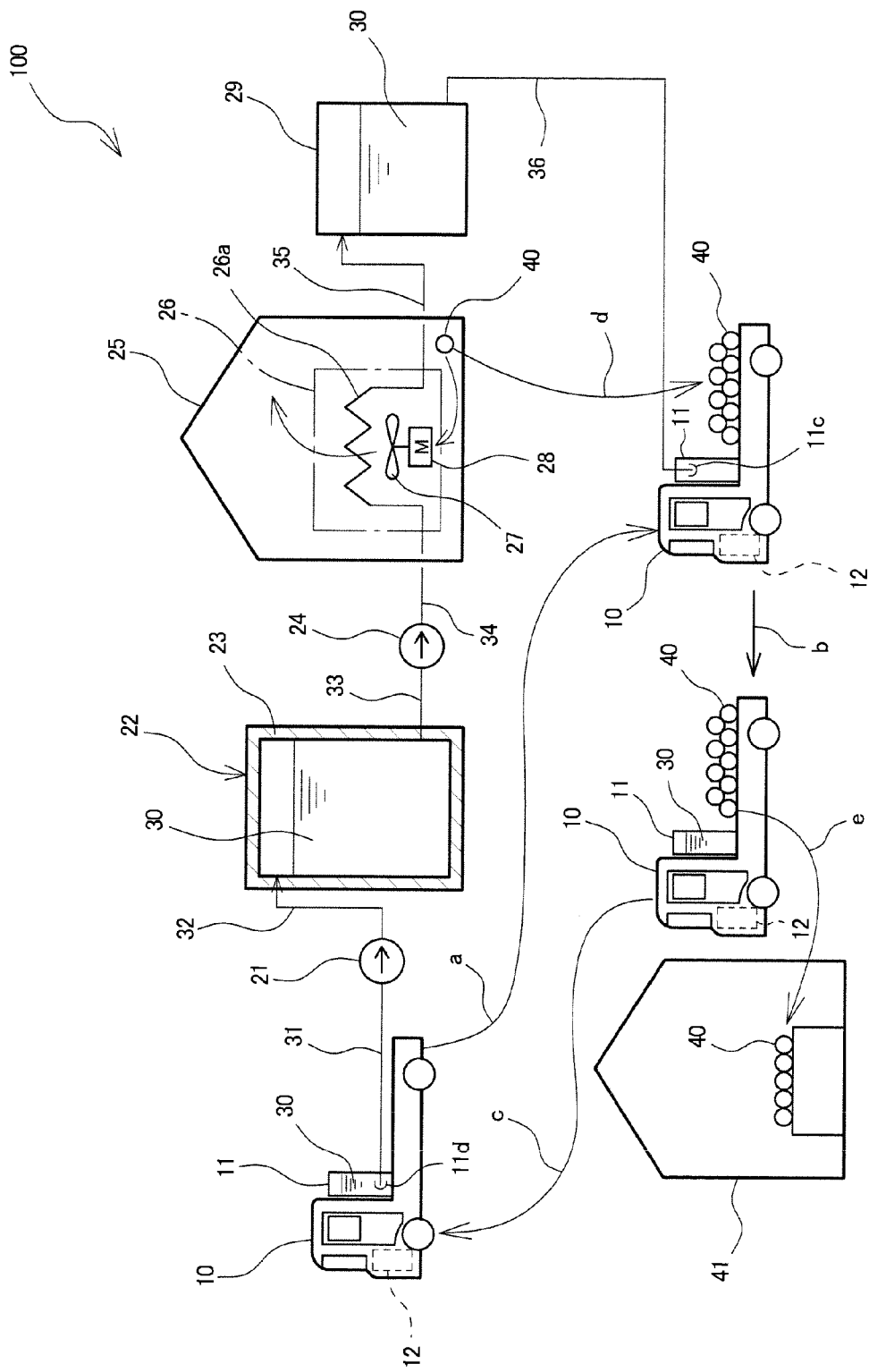
FIG. 1 is an explanatory diagram showing the configuration of an exhaust heat utilization system in an embodiment of the invention.

Embodiments of the invention are explained below with reference to the drawings. As shown in FIG. 1, an exhaust heat utilization system 100 in this embodiment includes a working fluid heating tank 11 mounted on a truck 10, which is a vehicle driven by an engine 12, a heat insulation tank 22 in which a working fluid 30 heated by the working fluid heating tank 11 is stored, a heater 26 configured to heat the interior of a greenhouse 25 with the working fluid 30, and a working fluid recovery tank 29 in which the working fluid 30 discharged from the heater 26 is stored. A working fluid inlet tube 32 and a working fluid outlet tube 33 are connected to the heat insulation tank 22. A transfer pump 21 configured to transfer the working fluid 30 stored in the working fluid heating tank 11 mounted on the truck 10 to the heat insulation tank 22 is provided in the working fluid inlet tube 32. A working fluid extracting tube 31 detachably attached to the working fluid heating tank 11 is attached to an inlet of the transfer pump 21.

A working fluid supply pump 24 configured to feed the working fluid 30 to the heater 26 is attached to the working fluid outlet tube 33. A working fluid supply tube 34 for supplying the working fluid 30 to the heater 26 is connected to an outlet of the working fluid supply pump 24. The heater 26 and the working fluid recovery tank 29 are connected by a working fluid discharge tube 35. A working fluid filling tube 36 detachably attached to a working fluid inlet 11c of the working fluid heating tank 11 is connected to the working fluid recovery tank 29.

A heat insulating material 23 is attached to the outside of the heat insulation tank 22. The heat insulation tank 22 can maintain the working fluid 30 stored in the inside thereof in a high temperature state. The capacity of the heat insulation tank 22 is larger than the capacity of the working fluid heating tank 11 mounted on the truck 10. For example, the capacity of the heat insulation tank 22 may be set to a capacity several to ten times as large as the capacity of the working fluid heating tank 11. Similarly, the capacity of the working fluid recovery tank 29 is larger than the capacity of the working fluid heating tank 11. The capacity of the working fluid recovery tank 29 may be set to a capacity several to ten times as large as the capacity of the working fluid heating tank 11. The heater 26 includes a radiator 26a, through which the working fluid 30 flows, configured to radiate the heat of the working fluid 30 and a fan 27 configured to circulate the air heated by the radiator 26a into the greenhouse 25. The fan 27 is driven by a motor 28. The greenhouse 25 is a greenhouse for agricultural product cultivation. Agricultural products 40 such as cucumbers, tomatoes, and green peppers are cultivated in the greenhouse 25. The cultivated agricultural products 40 are transported to a market 41 by the truck 10.

Figure 2:
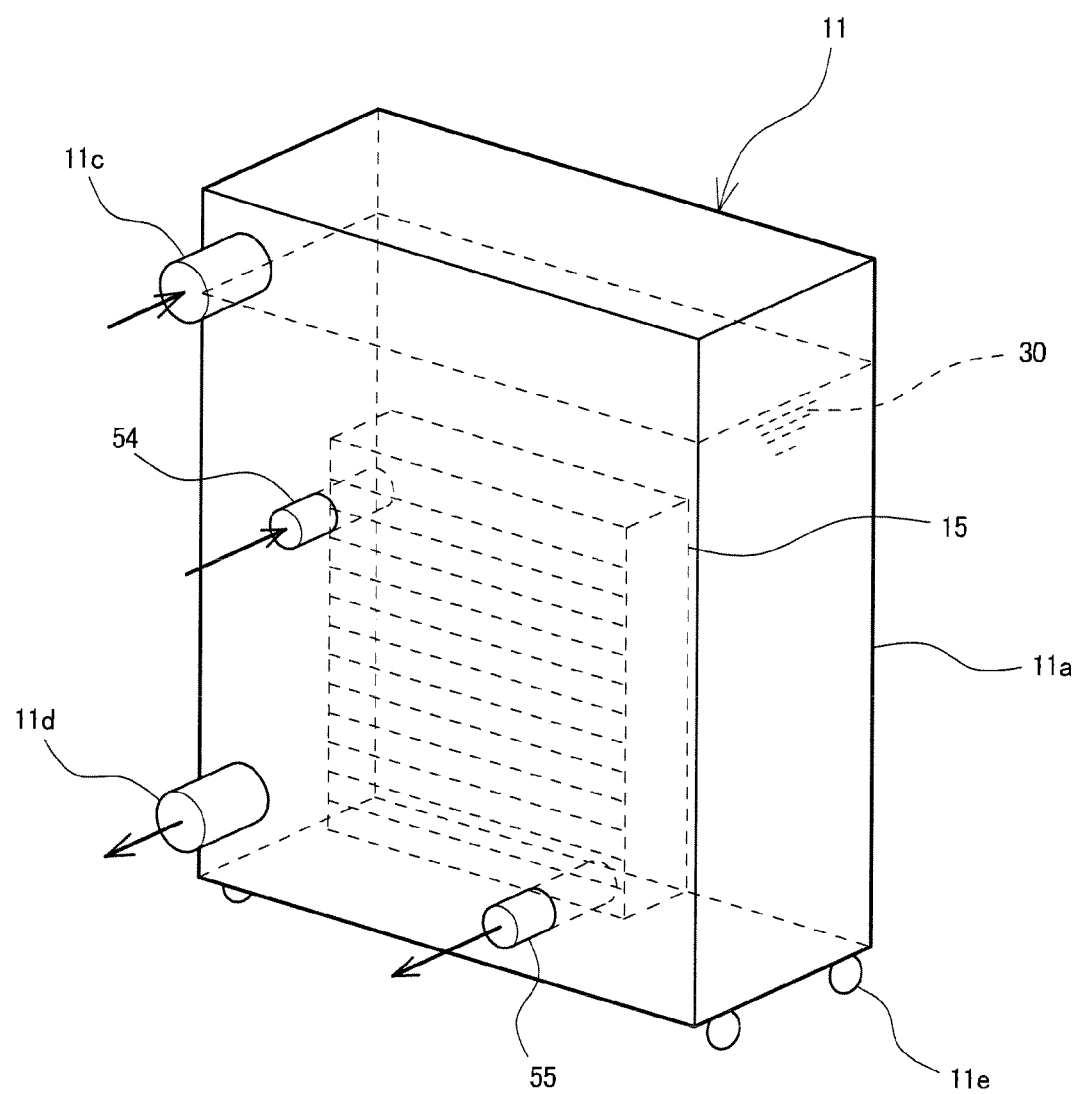
FIG. 2 is a perspective view showing the configuration of a working fluid heating tank of the exhaust heat utilization system in the embodiment of the invention.

As shown in FIG. 2, the working fluid heating tank 11 includes a rectangular-parallelepiped casing 11a made of metal having a size that enables the casing 11a to be loaded on the truck 10. The working fluid 30 is stored in the inside of the casing 11a. A not-shown heating insulating material is attached to the external surface of the casing 11a. A working fluid inlet 11c for leading in the working fluid 30 is provided in an upper part of the casing 11a. A working fluid outlet 11d for discharging the working fluid 30 is provided in a lower part of the casing 11a. A heat exchanger 15 for heating the working fluid 30 is attached to the inside of the casing 11a. A coolant inlet 54 to which a high-temperature coolant of the engine 12 shown in FIG. 1 is led in and a coolant outlet 55 for returning a low-temperature coolant after heat exchange to a cooling system of the engine 12 are provided in an upper part of the heat exchanger 15. Each of the coolant inlet 54 and the coolant outlet 55 is attached to pierce through the casing 11a. The working fluid heating tank 11 may be detachably mounted on the truck 10 so that it can be treated as a payload of the truck 10. In this case, casters 11e may be attached to lower parts of the casing 11a to facilitate attachment and detachment.

Figure 3:
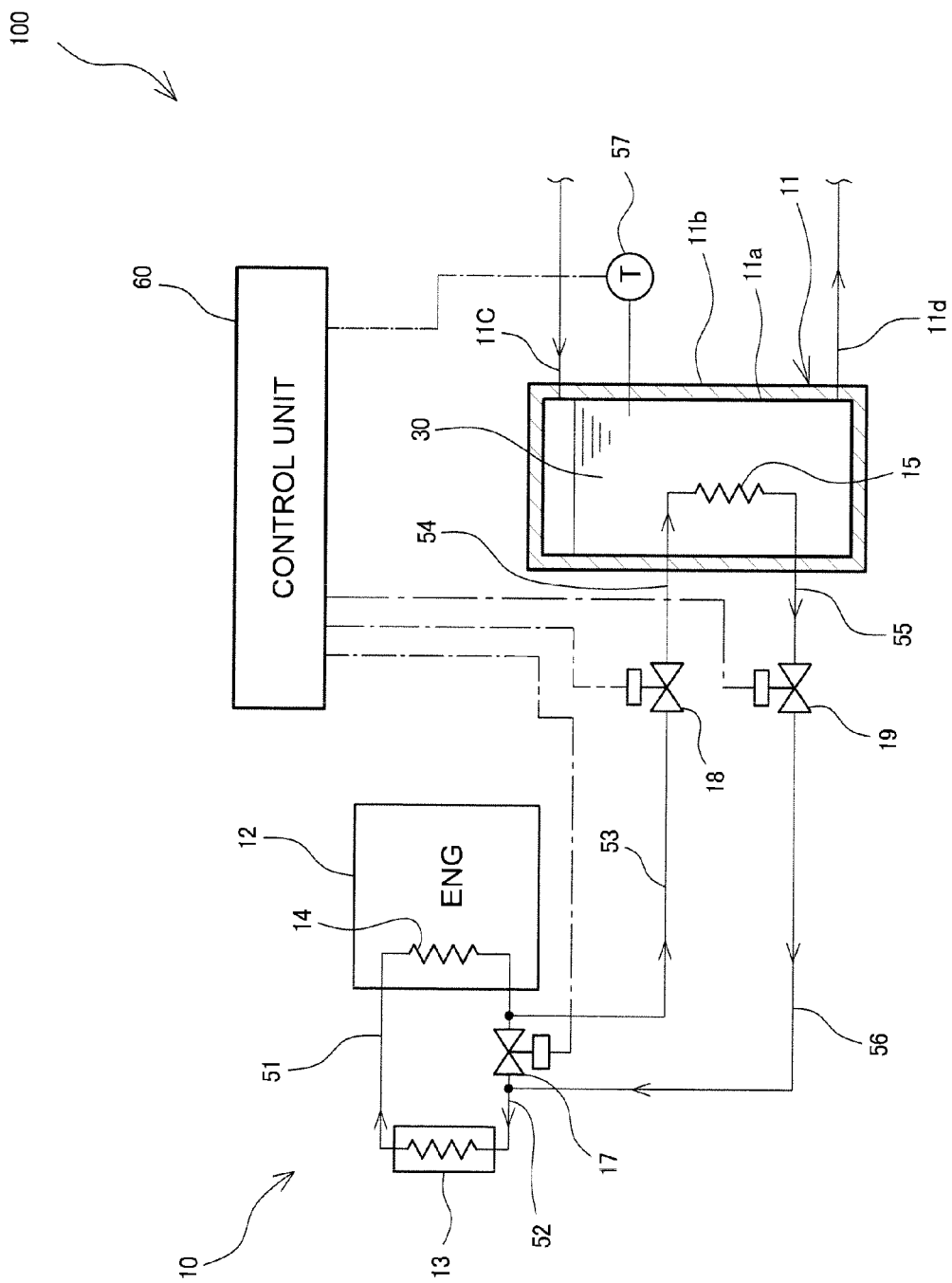
FIG. 3 is a system diagram showing a heating system configured to heat a working fluid stored in the working fluid heating tank of the exhaust heat utilization system in the embodiment of the invention.

As shown in FIG. 3, a cooling system configured to cool the engine 12 is provided in the truck 10. The cooling system includes a coolant channel 14 such as a cooling jacket on the inside of the engine 12, a radiator 13 configured to cool the coolant, and a low-temperature coolant pipe 51 and a high-temperature coolant pipe 52 configured to connect the coolant channel 14 and the radiator 13. When the engine 12 operates, the low-temperature coolant is supplied from the low-temperature coolant pipe 51 to the coolant channel 14 on the inside of the engine 12. The coolant is heated in the coolant channel 14 of the engine 12 to be the high-temperature coolant and flows from the high-temperature coolant pipe 52 to the radiator 13. The high-temperature coolant is cooled by the radiator 13 and returns to the low-temperature coolant.

As shown in FIG. 3, a heating system configured to heat the working fluid 30, which is stored in the working fluid heating tank 11, with the high-temperature coolant heated by the cooling system of the engine 12 is provided in the truck 10. The heating system includes a coolant feed tube 53 and a coolant return tube 56 connected to the high-temperature coolant pipe 52 to feed the coolant of the engine 12 to the heat exchanger 15 attached to the inside of the working fluid heating tank 11, the heat exchanger 15, a coolant inlet shut-off valve 18, and a coolant outlet shut-off valve 19. The coolant feed tube 53 is connected to the coolant inlet 54 of the heat exchanger 15 via the coolant inlet shut-off valve 18. The coolant return tube 56 is connected to the coolant outlet 55 of the heat exchanger 15 via the coolant outlet shut-off valve 19. A high-temperature coolant pipe shut-off valve 17 is attached between a branch point of the high-temperature coolant pipe 52 and the coolant feed tube 53 and a merging point of the coolant return tube 56. A heat insulating material 11b is attached to the outside of the working fluid heating tank 11. A temperature sensor 57 for measuring the temperature of the working fluid 30 stored in the inside of the working fluid heating tank 11 is attached to the working fluid heating tank 11. The shut-off valves 17, 18, and 19 and the temperature sensor 57 are connected to a control unit 60. The control unit 60 may be a computer including a CPU on the inside or may be an analog control circuit.

When the engine 12 operates and the heated coolant starts to flow to the high-temperature coolant pipe 52, the control unit 60 closes the high-temperature coolant pipe shut-off valve 17 and opens the coolant inlet shut-off valve 18 and the coolant outlet shut-off valve 19. Then, the high-temperature coolant flowing out from the engine 12 to the high-temperature coolant pipe 52 flows from the high-temperature coolant pipe 52 to the coolant feed tube 53 and flows into the heat exchanger 15 from the coolant inlet 54 passing through the coolant inlet shut-off valve 18. In the heat exchanger 15, the high-temperature coolant flowing into the heat exchanger 15 exchanges heat with the working fluid 30 stored in the inside of the working fluid heating tank 11 and heats the working fluid 30. The cooled coolant returns from the coolant return tube 56 to the high-temperature coolant pipe 52 passing though the coolant outlet shut-off valve 19 from the coolant outlet 55 of the heat exchanger 15 and flows from the high-temperature coolant pipe 52 to the radiator 13. In this way, the temperature of the working fluid 30 is raised by feeding the high-temperature coolant heated in the engine 12 to the heat exchanger 15.

The control unit 60 acquires the temperature of the working fluid 30 using the temperature sensor 57. When the temperature of the working fluid 30 exceeds a predetermined temperature, the control unit 60 opens the high-temperature coolant pipe shut-off valve 17 and closes the coolant inlet shut-off valve 18 and the coolant outlet shut-off valve 19 to stop the supply of the high-temperature coolant to the heat exchanger 15.

Various fluids can be used as the working fluid 30. For example, when water is used, the supply of the high-temperature coolant may be stopped if the temperature of the water rises to near 100° C., for example, 90° C. When water containing an additive for freezing prevention is used as the working fluid 30, the supply of the high-temperature coolant to the heat exchanger 15 may be stopped, for example, if the temperature of the water rises to a predetermined temperature equal to or higher than 100° C. In this way, the hot water of about 90° C. is stored in the inside of the working fluid heating tank 11.

As indicated by arrows "a" to "c" in FIG. 1, the truck 10 travels back and forth between the market 41 and the greenhouse 25 for agricultural product cultivation and transports the agricultural products 40 cultivated in the greenhouse 25 to the market 41. As indicated by an arrow "c" in FIG. 1, the truck 10 moves from the market 41 to the greenhouse 25 in order to receive the agricultural products 40 cultivated in the greenhouse 25. While the truck 10 moves from the market 41 to the greenhouse 25, as explained above, the working fluid 30 stored in the working fluid heating tank 11 is heated to the predetermined temperature by the high-temperature coolant of the engine 12 for driving mounted on the truck 10. The heated working fluid 30 is stored in a high temperature state in the heat-insulated working fluid heating tank 11.

When the truck 10 arrives at the greenhouse 25, the working fluid extraction tube 31 is connected to the working fluid outlet 11d of the working fluid heating tank 11 mounted on the truck 10. When the working fluid extraction tube 31 is connected, the transfer pump 21 is started and the working fluid 30 is fed to the heat insulation tank 22. The capacity of the heat insulation tank 22 is several times as large as the capacity of the working fluid heating tank 11. Therefore, the heat insulation tank 22 can store the working fluid 30 in the working fluid heating tanks 11 of several trucks 10. When the working fluid 30 in the working fluid heating tanks 11 of the several trucks 10 is stored, the working fluid supply pump 24 is started to feed the high-temperature working fluid 30 stored in the heat insulation tank 22 to the heater 26. The high-temperature working fluid fed to the heater 26 exchanges heat with the air in the greenhouse 25 and heats the interior of the greenhouse 25. The temperature of the working fluid then falls. The cooled working fluid 30 is recovered in the working fluid recovery tank 29 passing through the working fluid discharge tube 35 from the heater 26.

When the working fluid 30 heated in the working fluid heating tank 11 is transferred to the heat insulation tank 22, the working fluid heating tank 11 of the truck 10 is emptied. When the working fluid heating tank 11 is emptied, the transfer pump 21 is stopped, the working fluid extraction tube 31 is removed, and the working fluid filling tube 36 is connected to the working fluid inlet 11c of the working fluid heating tank 11. Then, the working fluid 30 flows into the working fluid heating tank 11 of the truck 10 from the working fluid recovery tank 29. When a predetermined volume of the working fluid 30 has been filled into the working fluid heating tank 11, the working fluid filling tube 36 is removed. The agricultural products 40 cultivated in the greenhouse 25 are loaded on the bed of the truck 10. When the filling of the working fluid 30 in the working fluid heating tank 11 and the loading of the agricultural products 40 on the truck 10 end, the truck 10 leaves for the market 41. When the truck 10 arrives at the market 41, the agricultural products 40 loaded on the truck 10 are unloaded from the truck 10 and carried into the market 41. The truck 10 then leaves for the greenhouse 25. The working fluid 30 in the working fluid heating tank 11 of the truck 10 is heated to the predetermined temperature while the truck 10 travels back and forth between the greenhouse 25 and the market 41. When the truck 10 arrives at the greenhouse 25, the heated working fluid 30 is transferred to the heat insulation tank 22 and used for heating of the greenhouse 25.

Figure 4:
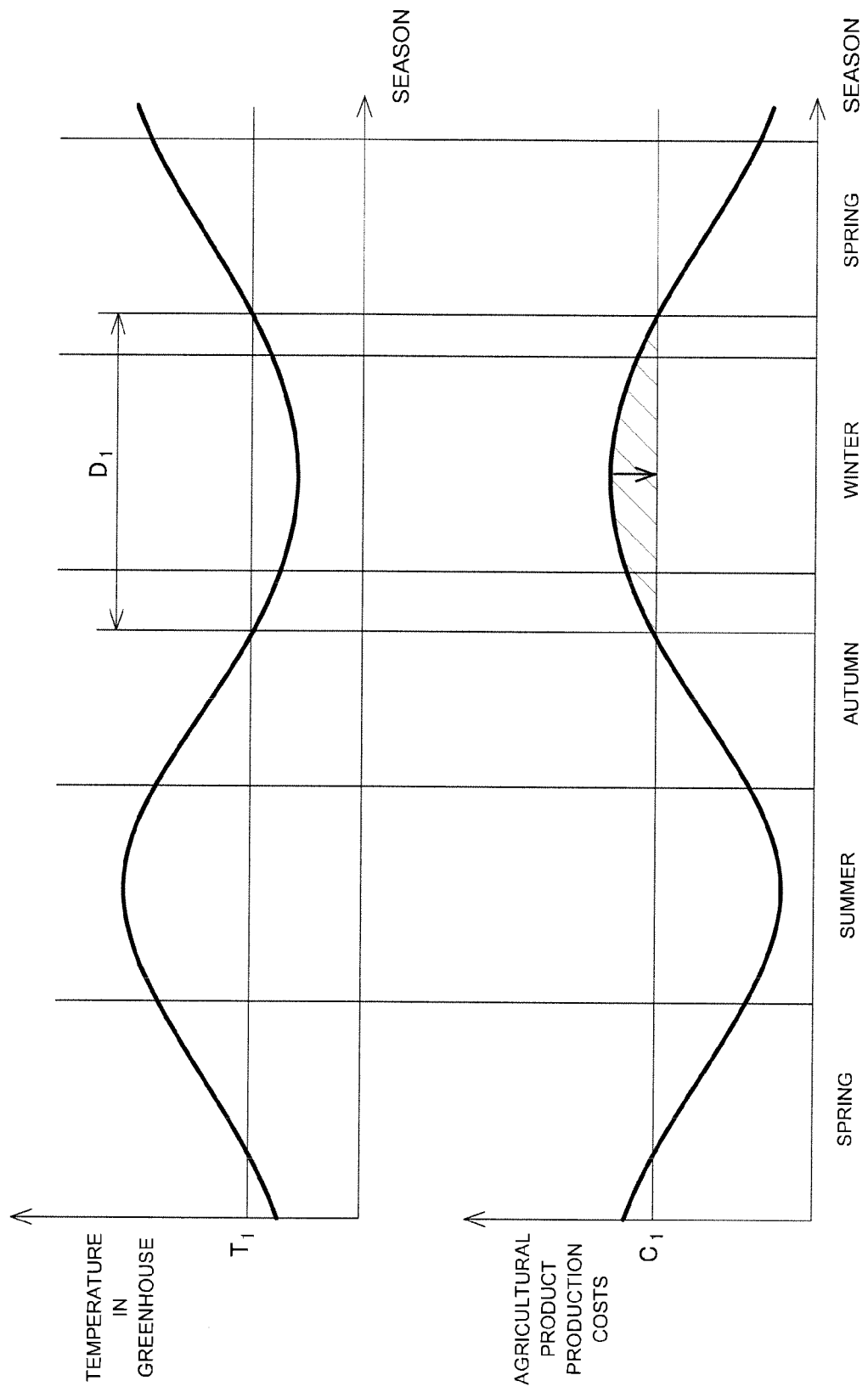
FIG. 4 is a graph showing seasonal changes in temperature in a greenhouse and production costs of agricultural products.

As shown in FIG. 4, when vegetables such as green peppers, cucumbers, and eggplants are cultivated in the greenhouse 25, it is necessary to set the temperature of the greenhouse 25 to be equal to or higher than a predetermined temperature $T_1$. Such vegetables are often cultivated in summer. However, in recent years, demand has increased for such vegetables even in winter. It is necessary to raise the temperature of the greenhouse 25 by burning oil during a period $D_1$ when the temperature in the greenhouse 25 is lower than the predetermined temperature $T_1$. Therefore, there is a problem in that the production costs of the agricultural products 40 increase and exceed a profitable line of business $C_1$ during the period $D_1$.

In the exhaust heat utilization system 100 in this embodiment, heat emitted from the engine 12 of the truck 10 to the outside by the radiator 13 can be recovered as the high-temperature working fluid 30 and the greenhouse 25 can be heated by the heat. Therefore, it is possible to effectively utilize exhaust heat and suppress the emission of carbon dioxide and suppress manufacturing costs of the agricultural products 40 in winter. The capacities of the heat insulation tank 22 and the working fluid recovery tank 29 are several times as large as the capacity of the working fluid heating tank 11 of the truck 10. Therefore, it is possible to sufficiently heat the greenhouse 25 even when the truck 10 does not continuously travel between the market 41 and the greenhouse 25. Further, even when a large amount of the high-temperature working fluid 30 is fed from the truck 10, it is possible to sufficiently store recovered exhaust heat in the heat insulation tank 22 as the high-temperature working fluid 30 and more effectively utilize the recovered exhaust heat.

In the embodiment explained above, it is explained that the exhaust heat of the engine 12 of the truck 10 is utilized for the heating of the greenhouse 25. However, the invention can be applied to any place that the truck 10 travels back and forth between. For example, the heat insulation tank 22 and the working fluid recovery tank 29 may be set in a garage for the truck 10 in a transportation company to heat a building and the like of the company utilizing the working fluid 30 heated by the exhaust heat of the truck 10.

In this embodiment, it is explained that the coolant of the engine 12 of the truck 10 is supplied to the heat exchanger 15 in the working fluid heating tank 11 to heat the working fluid 30. However, high-temperature lubricant of the engine 12 may be supplied to the heat exchanger 15 to heat the working fluid 30. Further, in this embodiment, it is explained that the vehicle is a truck 10. However, the working fluid heating tank 11 may be mounted on any vehicle such as a passenger car or a lightweight truck as long as the vehicle is driven by the engine 12.

Figure 5:
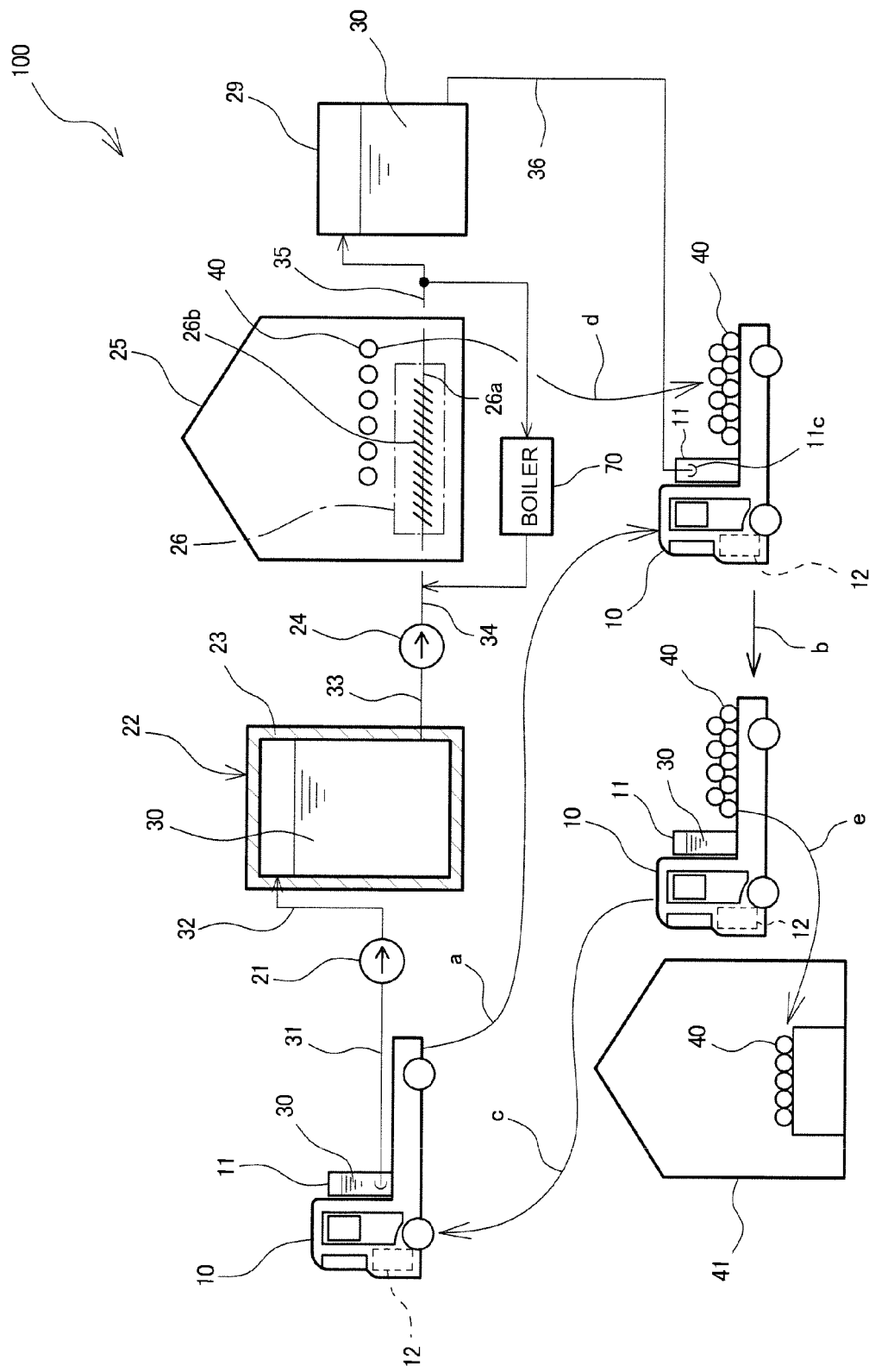
FIG. 5 is an explanatory diagram showing the configuration of an exhaust heat utilization system in another embodiment of the invention.

Another embodiment of the invention is explained with reference to FIG. 5. Components that are the same as the components in the embodiment explained above with reference to FIGS. 1 to 3 are denoted by the same reference numerals and signs. Explanation of these components is omitted.

In this embodiment, the radiator 26a of the heater 26 in the greenhouse 25 is configured by a finned tube 26b and the fan 27 is not provided. A boiler 70 for heating the working fluid 30 is provided to make it possible to continuously heat the interior of the greenhouse 25 even when the high-temperature working fluid 30 stored in the heat insulation tank 22 runs out. This embodiment produces the same effect as the effect in the embodiment explained above.

In the embodiments explained above, it is explained that the working fluid stored in the working fluid heating tank 11 mounted on the truck 10 is heated, exhaust heat is recovered, and the interior is heated by the recovered exhaust heat. However, the invention is not limited to the heating of the interior. The recovered exhaust heat can be utilized by exhaust heat recovering means of various forms. For example, a steam turbine and a generator may be driven to generate power utilizing the working fluid 30 heated by the working fluid heating tank 11 to supply generated power of the steam turbine and the generator to a power system. Water for hot-water supply may be heated by the heated working fluid 30. These exhaust heat recovering means may be combined according to a season. For example, water is used as the working fluid 30, in winter, hot water, i.e., the heated working fluid 30 is supplied from the heat insulation tank 22 to the heater 26 to heat the greenhouse 25. In summer or the like when it is unnecessary to heat the greenhouse 25, the hot water from the heat insulation tank 22 is supplied to the steam turbine as steam to drive the generator to supply generated power to the power system and charge a battery for vehicle driving.

EXPLANATION OF REFERENCE NUMERALS

10 Truck
11 Working fluid heating tank
11a Casing
11b Heat insulating material
11c Working fluid inlet
11d Working fluid outlet
12 Engine
13 Radiator
14 Coolant channel
15 Heat exchanger
17 High-temperature coolant pipe shut-off valve
18 Coolant inlet shut-off valve
19 Coolant outlet shut-off valve
21 Transfer pump
22 Heat insulation tank
23 Heat insulating material
24 Working fluid supply pump
25 Greenhouse
26 Heater
26a Radiator
26b Finned tube
27 Fan
28 Motor
29 Working fluid recovery tank
30 Working fluid
31 Working fluid extraction tube
32 Working fluid inlet tube
33 Working fluid outlet tube
34 Working fluid supply tube
35 Working fluid discharge tube
36 Working fluid filling tube
40 Agricultural products
41 Market
51 Low-temperature cooling pipe
52 High-temperature cooling pipe
53 Coolant feed tube
54 Coolant inlet
55 Coolant outlet
56 Coolant return tube
57 Temperature sensor
60 Control unit
70 Boiler
100 Exhaust heat utilization system

The invention claimed is:

1. An exhaust heat utilization system comprising:
a working fluid heating tank mounted on a vehicle driven by an engine and configured to heat a working fluid stored therein with exhaust heat of the engine; and
exhaust heat utilizing means for utilizing the exhaust heat recovered by supplying the working fluid heated by the working fluid heating tank,
the exhaust heat utilization system including:
a heat insulation tank connected to a working fluid inlet of the exhaust heat utilizing means and configured to store the working fluid heated by the working fluid heating tank and have a capacity larger than a capacity of the working fluid heating tank; and
a working fluid recovery tank connected to a working fluid outlet of the exhaust heat utilizing means and configured to store the working fluid having a temperature lower than a temperature at the working fluid inlet and have a capacity larger than the capacity of the working fluid heating tank, wherein
the exhaust heat utilization system transfers the heated working fluid in the working fluid heating tank to the heat insulation tank and fills the emptied working fluid heating tank with the low-temperature working fluid stored in the working fluid recovery tank.

2. The exhaust heat utilization system according to claim 1, wherein the working fluid heating tank is detachably mounted on the vehicle.

* * * * *